(12) United States Patent
Hansen et al.

(10) Patent No.: US 11,404,871 B1
(45) Date of Patent: Aug. 2, 2022

(54) METHODS AND SYSTEMS FOR AUTOMATIC GENERATION CONTROL OF RENEWABLE ENERGY RESOURCES

(71) Applicant: 8ME NOVA, LLC, San Francisco, CA (US)

(72) Inventors: Lukas Mercer Hansen, El Dorado Hills, CA (US); Gautham Ramesh, Emeryville, CA (US); Finbar Sheehy, San Francisco, CA (US)

(73) Assignee: 8ME NOVA, LLC, San Francisco, CA (US)

( * ) Notice: Subject to any disclaimer, the term of this patent is extended or adjusted under 35 U.S.C. 154(b) by 0 days.

(21) Appl. No.: 17/687,483

(22) Filed: Mar. 4, 2022

Related U.S. Application Data

(60) Provisional application No. 63/241,654, filed on Sep. 8, 2021.

(51) Int. Cl.
*G05B 15/02* (2006.01)
*H02J 3/00* (2006.01)
*H02J 7/00* (2006.01)
*H02J 3/28* (2006.01)
*H02J 3/38* (2006.01)

(52) U.S. Cl.
CPC .............. *H02J 3/004* (2020.01); *G05B 15/02* (2013.01); *H02J 3/28* (2013.01); *H02J 3/381* (2013.01); *H02J 7/0048* (2020.01)

(58) Field of Classification Search
CPC .... H02J 3/004; H02J 3/28; H02J 3/381; H02J 7/0048; G05B 15/02
See application file for complete search history.

(56) References Cited

U.S. PATENT DOCUMENTS

| 2015/0240784 | A1* | 8/2015 | Sagi | F03D 7/048 700/287 |
| 2015/0241892 | A1* | 8/2015 | Gaucher | G05F 1/67 700/291 |
| 2017/0077714 | A1* | 3/2017 | Corum | H02J 5/005 |
| 2021/0273483 | A1* | 9/2021 | Ding | H02J 3/48 |

* cited by examiner

*Primary Examiner* — Yuhui R Pan
(74) *Attorney, Agent, or Firm* — Foley & Lardner LLP

(57) ABSTRACT

The present disclosure provides systems and methods for an operation of an electric power plant comprising a renewable energy resource and an energy storage device. The method may comprise determining, at a first time, a forecast of predicted energy production by the electric power plant over a time period subsequent to the first time based on a forecast for the time period; detecting a current state of charge of the energy storage device; calculating a range of automatic generation controls the electric power plant is capable of satisfying for the time period based on the forecast of predicted energy production and the detected current state of charge of the energy storage device; and signaling, from the electric power plant to a central utility controlling a power grid, the range of automatic generation controls the electric power plant is capable of satisfying for the time period.

17 Claims, 10 Drawing Sheets

If available energy > required energy:

*BESS upper bound = min(headroom, BESS_discharge_capacity)*
*BESS lower bound = -chargeable_pv*
*BESS ideal = max(min(AGC_signal - pv_current, BESS upper bound), BESS lower bound)*

Else: (Available forecasted energy = required energy)

*BESS upper bound = -chargeable_pv*
*BESS lower bound = -chargeable_pv*
*BESS ideal = -chargeable_pv*

*FIG. 7*

If available headroom > required headroom:

*BESS upper bound = min(headroom, BESS_discharge_capacity)*
*BESS lower bound = -chargeable_pv*
*BESS ideal = max(min(AGC_signal - pv_current, BESS upper bound), BESS lower bound)*

Else: (Available forecasted headroom = required headroom)

*BESS upper bound = headroom*
*BESS lower bound = headroom*
*BESS ideal = headroom*

*FIG. 8*

METHODS AND SYSTEMS FOR AUTOMATIC GENERATION CONTROL OF RENEWABLE ENERGY RESOURCES

CROSS-REFERENCE TO RELATED APPLICATIONS

This application claims the benefit of priority to U.S. Provisional Application No. 63/241,654, filed Sep. 8, 2021, the entirety of which is incorporated by reference herein.

BACKGROUND

Renewable energy resources such as solar and wind power can provide large scale electricity with a fraction of the environmental effects of combustion-based power plants. These resources can be intermittent, which in turn can reduce their ability to be used in an electrical grid system that balances load and production on a real time basis.

SUMMARY

In one aspect of the present disclosure, a method is provided. The method may include determining, at a first time, a forecast of predicted energy production by an electric power plant over a time period subsequent to the first time based on a forecast for the time period, the electric power plant comprising a renewable energy resource and an energy storage device; detecting a current state of charge of the energy storage device; calculating a range of automatic generation controls the electric power plant is capable of satisfying for the time period based on the forecast of predicted energy production and the detected current state of charge of the energy storage device; and signaling, from the electric power plant to a central utility controlling a power grid, the range of automatic generation controls the electric power plant is capable of satisfying for the time period.

In some embodiments, receipt of the range of automatic generation controls causes the central utility to input the range of automatic generation controls into an optimization function for distributing energy from the power grid over the time period; and distribute energy to one or more loads from the power grid according to an output of the optimization function.

In some embodiments, the time period is a first time period, the forecast of predicted energy production is a first forecast of predicted energy production, the current state of charge is a first current state of charge, and the range of automatic generation controls is a first range of automatic generation controls, further comprising: during the first time period, determining a second forecast of predicted energy production by the electric power plant over a second time period subsequent to the first time period, based on a forecast for the second time period; detecting a second current state of charge of the energy storage device; calculating a second range of automatic generation controls the electric power plant is capable of satisfying for the second time period subsequent to the first time period; and signaling, from the electric power plant to the central utility, the second range of automatic generation controls the electric power plant is capable of satisfying for the second time period.

In some embodiments, calculating the range of automatic generation controls comprises determining a predicted power production based on the predicted energy production and a duration of the time period; determining a state of charge limit of the energy storage device has become binding; responsive to the determining the state of charge limit of the energy storage device has become binding, determining to discharge the energy storage device; and responsive to the determining to discharge the energy storage device, setting upper and lower limits of the range of automatic generation controls to the predicted power production plus a maximum achievable discharge power of the energy storage device.

In some embodiments, calculating the range of automatic generation controls further comprises determining a state of charge limit of the energy storage device has become binding; responsive to the determining the state of charge limit of the energy storage device has become binding, determining to charge the energy storage device; and responsive to the determining to charge the energy storage device, setting upper and lower limits of the range of automatic generation controls to zero.

In some embodiments, calculating the range of automatic generation controls further comprises determining a predicted power production based on the predicted energy production and a duration of the time period; determining a state of charge limit of the energy storage device has become binding; responsive to the determining the state of charge limit of the energy storage device has become binding, determining to charge the energy storage device; and responsive to the determining to charge the energy storage device, setting upper and lower limits of the range of automatic generation controls to an excess predicted power production over a maximum achievable charging power of the energy storage device.

In some embodiments, calculating the range of automatic generation controls further comprises setting the upper and lower limits of the range of automatic generation controls to an excess predicted power production is performed further responsive to determining the predicted power production exceeds the maximum achievable charge power of the energy storage device.

In some embodiments, calculating the range of automatic generation controls comprises determining a predicted power production based on the predicted energy production and a duration of the time period; determining a state of charge limit of the energy storage device has not become binding; responsive to the determining the state of charge limit of the energy storage device has not become binding, setting an upper limit of the range of automatic generation controls to a lesser of (a) a power limit of a point of interconnection of the power grid, and (b) a sum of the predicted power production and a maximum achievable discharge power of the energy storage device.

In some embodiments, calculating the range of automatic generation controls further comprises further responsive to the determining the state of charge limit of the energy storage device has not become binding, setting a lower limit of the range of automatic generation controls to a greater of (a) zero, and (b) the predicted power production minus the maximum achievable discharge power of the energy storage device.

In some embodiments, calculating the range of automatic generation controls comprises calculating a confidence score for the range of automatic generation controls, wherein signaling the range of automatic generation controls to the central utility comprises transmitting the confidence score for the range with the range.

In some embodiments, the method further comprises receiving, during the time period, a request for an amount of power below a lower bound of the range; and responsive to the request, sending, from the electric power plant, power equal to the lower bound to the power grid.

In another aspect, a system is disclosed. The one or more computer processors may be configured by machine-readable instructions to determine, at a first time, a forecast of predicted energy production by an electric power plant over a time period subsequent to the first time based on a forecast for the time period, the electric power plant comprising a renewable energy resource and an energy storage device; detecting a current state of charge of the energy storage device; calculate a range of automatic generation controls the electric power plant is capable of satisfying for the time period based on the forecast of predicted energy production and the detected current state of charge of the energy storage device; and signal, from the electric power plant to a central utility controlling a power grid, the range of automatic generation controls the electric power plant is capable of satisfying for the time period.

In some embodiments, receipt of the range of automatic generation controls causes the central utility to input the range of automatic generation controls into an optimization function for distributing energy from the power grid over the time period; and distribute energy to one or more loads from the power grid according to an output of the optimization function. In some embodiments, the time period is a first time period, the forecast of predicted energy production is a first forecast of predicted energy production, the current state of charge is a first current state of charge, and the range of automatic generation controls is a first range of automatic generation controls, wherein the one or more computing devices are further configured by machine-readable instructions to during the first time period, determine a second forecast of predicted energy production by the electric power plant over a second time period subsequent to the first time period, based on a forecast for the second time period; detect a second current state of charge of the energy storage device; calculate a second range of automatic generation controls the electric power plant is capable of satisfying for the second time period subsequent to the first time period; and signal, from the electric power plant to the central utility, the second range of automatic generation controls the electric power plant is capable of satisfying for the second time period.

In some embodiments, the one or more computer processors are configured by machine-readable instructions to calculate the range of automatic generation controls by determining a predicted power production based on the predicted energy production and a duration of the time period; determining a state of charge limit of the energy storage device has become binding; responsive to the determining the state of charge limit of the energy storage device has become binding, determining to discharge the energy storage device; and responsive to the determining to discharge the energy storage device, setting upper and lower limits of the range of automatic generation controls to the predicted power production plus a maximum achievable discharge power of the energy storage device.

In some embodiments, the one or more computer processors are configured by machine-readable instructions to calculate the range of automatic generation controls by determining a state of charge limit of the energy storage device has become binding; responsive to the determining the state of charge limit of the energy storage device has become binding, determining to charge the energy storage device; and responsive to the determining to charge the energy storage device, setting upper and lower limits of the range of automatic generation controls to zero.

In some embodiments, the one or more computer processors are configured by machine-readable instructions to calculate the range of automatic generation controls by determining a predicted power production based on the predicted energy production and a duration of the time period; determining a state of charge limit of the energy storage device has become binding; responsive to the determining the state of charge limit of the energy storage device has become binding, determining to charge the energy storage device; and responsive to the determining to charge the energy storage device, setting upper and lower limits of the range of automatic generation controls to an excess predicted power production over a maximum achievable charging power of the energy storage device.

In some embodiments, the one or more computer processors are configured by machine-readable instructions to set upper and lower limits of the range of automatic generation controls to an excess predicted power production further responsive to determining the predicted power production exceeds the maximum achievable charge power of the energy storage device. In some embodiments, the one or more computer processors are configured by machine-readable instructions to calculate the range of automatic generation controls by determining a state of charge limit of the energy storage device has not become binding; responsive to the determining the state of charge limit of the energy storage device has not become binding, setting an upper limit of the range of automatic generation controls to a lesser of (a) a power limit of a point of interconnection of the power grid, and (b) a sum of the predicted power production and a maximum achievable discharge power of the energy storage device.

In another aspect, one or more non-transitory computer storage media storing instructions are disclosed. The one or more non-transitory computer storage media may be operable, when executed by one or more computers, to cause said one or more computers to perform operations comprising determining, at a first time, a forecast of predicted energy production by the electric power plant over a time period subsequent to the first time based on a forecast for the time period, the electric power plant comprising an; detecting a current state of charge of the energy storage device; calculating a range of automatic generation controls the electric power plant is capable of satisfying for the time period based on the forecast of predicted energy production and the detected current state of charge of the energy storage device; and signaling, from an electric power plant comprising a renewable energy resource and an energy storage device to a central utility controlling a power grid, the range of automatic generation controls the electric power plant is capable of satisfying for the time period.

In an aspect, the present disclosure provides a method, comprising: (a) providing an electric power plant comprising a renewable energy resource and an energy storage device; and (b) signaling, from the electric power plant to a central utility, a range of automatic generation controls the electric power plant is capable of satisfying for a time period, wherein the range of automatic generation controls are signaled at a time prior to the time period.

In some embodiments, the renewable energy resource is a solar resource, a wind resource, or any combination thereof. In some embodiments, the range of automatic generation controls have a predetermined duration. In some embodiments, the range of automatic generation controls are determined using one or more of a capacity of the renewable energy resource, a capacity of the energy storage device, a current charge level of the energy storage device, a discharge rate of the energy storage device, a charge rate of the energy storage device, a forecast of an output of the renewable energy resource, or a property of a substation between the electric power plant and a power grid. In some embodiments, the method further comprises (c), supplying, from the electric power plant to an energy grid, an amount of electricity within the range of automatic generation controls. In some embodiments, the time is at least about 1 hour prior to the time period. In some embodiments, the time is at least about 4 hours prior to the time period. In some embodiments, the time is at least about 6 hours prior to the time period. In some embodiments, the time is at least about 12 hours prior to the time period. In some embodiments, the time is at least about 24 hours prior to the time period. In some embodiments, an upper limit or a lower limit of the range of automatic generation controls is based at least in part on one or more of a maximum or minimum output of the renewable energy resource, a maximum or minimum output of the energy storage device, a capacity of an interconnect between the electric power plant and an energy grid, a forecast of an energy production by the electric power plant, and a state of charge of the energy storage device. In some embodiments, the forecast provides a plurality of ranges of possible production values of the electric power plant. In some embodiments, the method further comprises a confidence interval associated with each range of the plurality of ranges. In some embodiments, the forecast comprises a forecast for a time longer than the time period. In some embodiments, the range of automatic generation controls are associated with a period of time the range of automatic generation controls are valid for.

In another aspect, the present disclosure provides a system, comprising: an electric power plant comprising a renewable energy resource and an energy storage device; and one or more computer processors operatively coupled to computer memory, wherein the one or more computer processors are individually or collectively configured to signal, from the electric power plant to a central utility, a range of automatic generation controls the electric power plant is capable of satisfying for a time period at a time prior to the time period.

In another aspect, the present disclosure provides one or more non-transitory computer storage media storing instructions that are operable, when executed by one or more computers, to cause the one or more computers to perform operations comprising (a) signaling, from an electric power plant comprising a renewable energy resource and an energy storage device to a central utility, a range of automatic generation controls the electric power plant is capable of satisfying for a time period at a time prior to the time period.

Another aspect of the present disclosure provides a system comprising one or more computer processors and computer memory coupled thereto. The computer memory comprises machine executable code that, upon execution by the one or more computer processors, implements any of the methods above or elsewhere herein.

Additional aspects and advantages of the present disclosure will become readily apparent to those skilled in this art from the following detailed description, wherein only illustrative embodiments of the present disclosure are shown and described. As will be realized, the present disclosure is capable of other and different embodiments, and its several details are capable of modifications in various obvious respects, all without departing from the disclosure. Accordingly, the drawings and description are to be regarded as illustrative in nature, and not as restrictive.

INCORPORATION BY REFERENCE

All publications, patents, and patent applications mentioned in this specification are herein incorporated by reference to the same extent as if each individual publication, patent, or patent application was specifically and individually indicated to be incorporated by reference. To the extent publications and patents or patent applications incorporated by reference contradict the disclosure contained in the specification, the specification is intended to supersede and/or take precedence over any such contradictory material.

BRIEF DESCRIPTION OF THE DRAWINGS

The novel features of the invention are set forth with particularity in the appended claims. A better understanding of the features and advantages of the present invention will be obtained by reference to the following detailed description that sets forth illustrative embodiments, in which the principles of the invention are utilized, and the accompanying drawings (also "Figure" and "FIG." herein), of which:

FIGS. 7-8 are examples of pseudocode for a charging logic loop and a discharge logic loop, respectively, for generating a AGC range, according to some embodiments.

DETAILED DESCRIPTION

While various embodiments of the invention have been shown and described herein, it will be obvious to those skilled in the art that such embodiments are provided by way of example only. Numerous variations, changes, and substitutions may occur to those skilled in the art without departing from the invention. It should be understood that various alternatives to the embodiments of the invention described herein may be employed.

Whenever the term "at least," "greater than," or "greater than or equal to" precedes the first numerical value in a series of two or more numerical values, the term "at least," "greater than" or "greater than or equal to" applies to each of the numerical values in that series of numerical values. For example, greater than or equal to 1, 2, or 3 is equivalent to greater than or equal to 1, greater than or equal to 2, or greater than or equal to 3.

Whenever the term "no more than," "less than," or "less than or equal to" precedes the first numerical value in a series of two or more numerical values, the term "no more than," "less than," or "less than or equal to" applies to each of the numerical values in that series of numerical values. For example, less than or equal to 3, 2, or 1 is equivalent to less than or equal to 3, less than or equal to 2, or less than or equal to 1.

Certain inventive embodiments herein contemplate numerical ranges. When ranges are present, the ranges include the range endpoints. Additionally, every sub range and value within the range is present as if explicitly written out. The term "about" or "approximately" may mean within an acceptable error range for the particular value, which will depend in part on how the value is measured or determined, e.g., the limitations of the measurement system. For example, "about" may mean within 1 or more than 1 standard deviation, per the practice in the art. Alternatively, "about" may mean a range of up to 20%, up to 10%, up to 5%, or up to 1% of a given value. Where particular values are described in the application and claims, unless otherwise stated the term "about" meaning within an acceptable error range for the particular value may be assumed.

Figure 1:
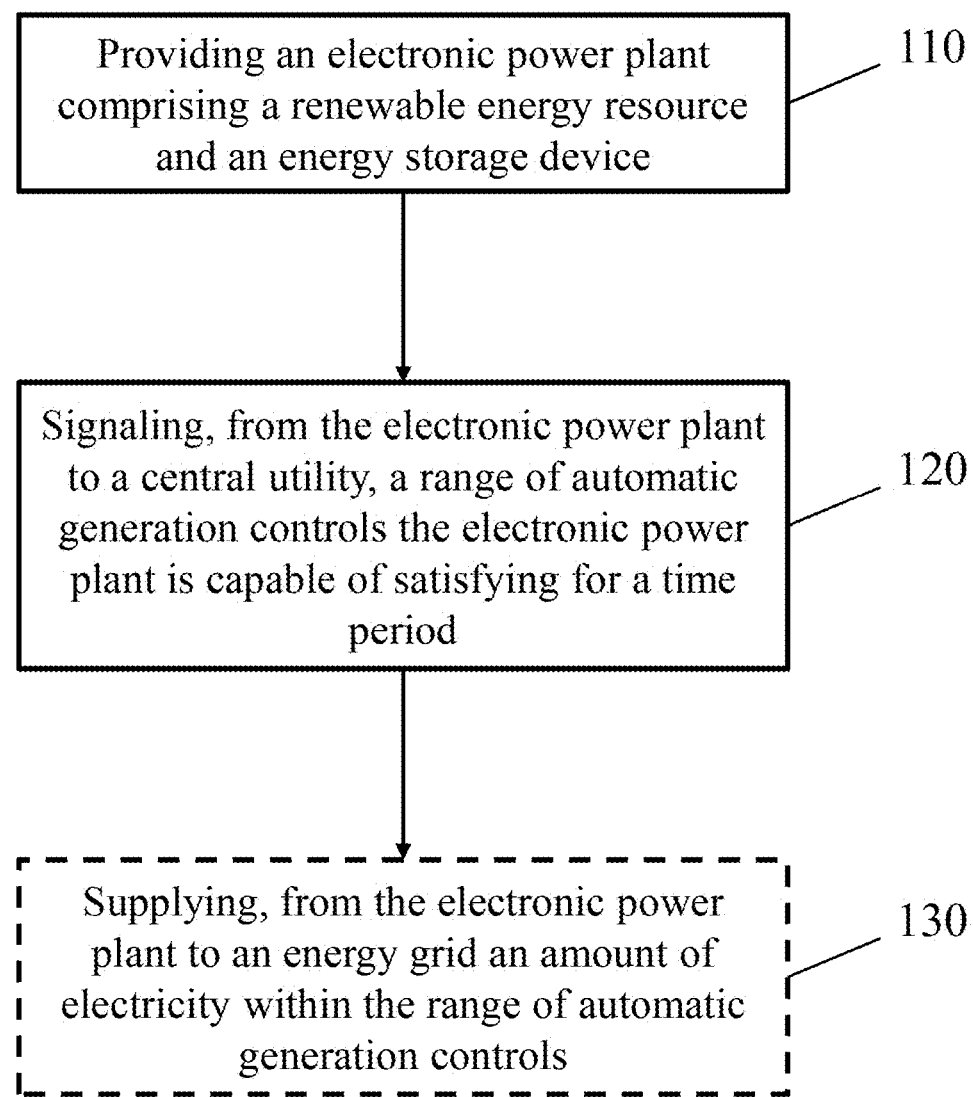
FIG. 1 is a flowchart of a method, according to an embodiment of the present disclosure.

FIG. 1 is a flowchart of a method 100, according to an embodiment of the present disclosure. The method 100 may comprise providing an electric power plant comprising a renewable energy resource and an energy storage device (110). The electronic power plant may comprise a plurality of renewable energy resources. The electric power plant may comprise a plurality of energy storage devices. The operations of method 100 may be performed by a controller or other computing device comprising one or more processors and memory. The operations of method 100 may be performed in any order and may contain more or fewer operations, depending on the implementation.

The renewable energy resource may comprise a solar resource, a wind resource, a hydroelectric resource, a biomass resource, a geothermal resource, a tidal resource, or the like, or any combination thereof. The solar resource may comprise one or more solar panel modules (e.g., one or more silicon solar panels, one or more tandem solar panels, etc.), one or more solar concentrators (e.g., mirrors, luminescent concentrators, etc.), one or more heliostats (e.g., central solar towers), or the like, or any combination thereof. The wind resource may comprise one or more wind turbines (e.g., horizontal-axis turbines, vertical-axis turbines, counter-rotating wind turbines, etc.). The renewable energy resource may comprise at least about 2, 5, 10, 50, 100, 500, 1,000, 5,000, 10,000, 50,000, or more individual components of the resource. For example, the renewable energy resource can comprise 1,000 individual solar modules. The renewable energy resource may comprise at most about 50,000, 10,000, 5,000, 1,000, 500, 100, 50, 10, 5, or fewer individual components of the resource.

The energy storage device may comprise one or more batteries. The one or more batteries may comprise one or more battery cells. The one or more batteries may comprise rechargeable batteries. The one or more batteries may comprise one or more lithium-ion batteries, lead-acid batteries, flow batteries, aluminum-ion batteries, metal-air batteries, molten-salt batteries, nickel-cadmium batteries, nickel-metal hydride batteries, or the like, or any combination thereof. The energy storage device may comprise a hydroelectric energy storage device. For example, the energy storage device can use the potential energy of a body of water as energy storage. The energy storage device may have a capacity of at least about 0.01, 0.05, 0.1, 0.5, 1, 5, 10, 50, 100, 500, 1,000, 5,000, 10,000, or more megawatt hours. The energy storage device may have a capacity of at most about 10,000, 5,000, 1,000, 500, 100, 50, 10, 5, 1, 0.5, 0.1, 0.05, 0.01, or fewer megawatt hours.

The method 100 may comprise signaling, from the electric power plant to a central utility, a range of automatic generation controls the electric power plant is capable of satisfying for a time period. The range of automatic generation controls may be signaled at a time prior to the time period (120). The central utility may be an electrical grid control. For example, the electric power plant can be connected to a power grid, and the signal can be sent to the controller of the power grid.

The range of automatic generation controls (AGC's) may have a predetermined duration. For example, the electric power plant can transmit a range of automatic generation controls that are valid for a predetermined time. In this example, once that time has passed, the plant can send a new set of AGC's. The predetermined duration may be based on, for example, the projected output of the electric power plant, the charge status of the energy storage device, the maximum and/or minimum values of the AGC range, or the like, or any combination thereof. The predetermined duration may be at least about 0.25, 0.5, 0.75, 1, 2, 3, 4, 5, 6, 7, 8, 9, 10, 11, 12, 13, 14, 15, 16, 17, 18, 19, 20, 21, 22, 23, 24, 48, 72, or more hours. The predetermined duration may be at most about 72, 48, 24, 23, 22, 21, 20, 19, 18, 17, 16, 15, 14, 13, 12, 11, 10, 9, 8, 7, 6, 5, 4, 3, 2, 1, 0.75, 0.5, 0.25, or less hours. The time the range of AGC's is signaled to the central utility may be at least about 0.25, 0.5, 0.75, 1, 2, 3, 4, 5, 6, 7, 8, 9, 10, 11, 12, 13, 14, 15, 16, 17, 18, 19, 20, 21, 22, 23, 24, 48, 72, or more hours prior to the time period. The time the range of AGC's is signaled to the central utility may be at most about 72, 48, 24, 23, 22, 21, 20, 19, 18, 17, 16, 15, 14, 13, 12, 11, 10, 9, 8, 7, 6, 5, 4, 3, 2, 1, 0.75, 0.5, 0.25, or less hours prior to the time period. The range of AGC's may be associated with a period of time that the AGC's are valid for. For example, the AGC's can be transmitted stating that the ranges are valid for a period of 6 hours. The range of AGC's may be valid for a fixed period of time. For example, each range can be valid for about one day.

The range of AGC's may be determined using one or more of a capacity of the renewable energy resource, a capacity of the energy storage device, a current charge level of the energy storage device, a discharge rate of the energy storage device, a forecast of an output of the renewable energy resource, a property of a substation situated between the electric power plant and a power grid, or the like, or any combination thereof. The capacity of the renewable energy resource may be a theoretical maximum output of the renewable energy resource. For example, the capacity can be the rated output of a solar module multiplied by the number of solar modules in the renewable energy resource. The capacity of the renewable energy resource may be an operating capacity. For example, the maximum output of the resource can be measured over a period of time, and the average over that time period can be used as the capacity of the renewable energy resource. The range of AGC's may be determined at least in part using a requirement for a state of charge of the energy storage device. For example, an engineering constraint may require an energy storage device to maintain at least a 10% charge. In this example, the range can be determined so as to leave at least 10% charge in the energy storage device. The range of AGC's may be determined at least in part using one or more other grid charging constraints. Examples of grid charging constraints include, but are not limited to, a limitation on if the energy storage device may be charged with energy from the grid (e.g., a prohibition or limitation on the amount of energy permissible to draw from the grid), a limitation of the maximum instantaneous power that may be drawn from the grid to charge the energy storage device (e.g., the maximum output of the grid may be less than the maximum instantaneous power that the energy storage device may be capable of accepting), or the like, or any combination thereof.

The capacity of the energy storage device may be a rated capacity of the energy storage device. For example, a capacity of a battery can be the number of watt hours the battery is rated to hold. The capacity of the energy storage device can be a measured average of the capacity of the energy storage device. For example, the running average of the capacity of the energy storage device can be used as the capacity of the energy storage device. In this example, a degradation of the energy storage device due to age can be factored into the capacity of the energy storage device used for the AGC. The current charge level of the energy storage device may be a measure of the amount of electrical energy contained within the energy storage device. For example, a battery with a capacity of 50 kilowatt hours with a current charge of 25 kilowatt hours can have a current charge level of 50%. The discharge rate of the energy storage device can be a rate at which the energy storage device is capable of discharging stored electrical energy. The discharge rate may be affected by the type of energy storage device used (e.g., a lithium ion battery can have a faster discharge rate than a lead acid battery). The discharge rate can limit the amount of energy that is deliverable by the energy storage device in a given period of time. For example, a battery with 8 megawatt hours of stored energy but a maximum discharge rate of 1 megawatt can take 8 hours to discharge. The energy storage device may have a minimum level of charge to be maintained within the energy storage device. For example, a lithium ion battery may have a minimum charge level used to prevent irreversible transformations for occurring within the battery.

The forecast of the output of the renewable energy resource may be a prediction of the output of the resource based on one or more factors. For example, a forecast for a solar resource can consider the projected weather for the region with the solar resource. In this example, a weather forecast that includes cloudy weather can result in a forecast for the solar resource that is lower than if the weather forecast were for clear days. Similarly, a weather forecast that predicts consistent winds can positively influence a forecast for a wind resource. Examples of factors include, but are not limited to, weather conditions, day lengths, conditions of the sun, satellite images, ground-based sky images, or the like, or any combination thereof. The property of the substation between the electric power plant and the power grid may be a property of the capacity of the substation. For example, a substation may have a maximum throughput of 10 megawatts while the electric power plant can have a maximum output of 15 megawatts. In this example, the upper bound of the range may be 10 megawatts as limited by the substation. Examples of substation properties may include, but are not limited to, substation throughput capacity, substation location, other resources connected to the substation, or the like, or any combination thereof. A first forecast may be transmitted with a first confidence interval, and a second forecast may be transmitted later with a second confidence interval. For example, a first forecast can be associated with a 50% confidence interval, but a later, more accurate forecast can be transmitted with an 80% confidence interval.

An upper limit or a lower limit of the range of AGC's may be based at least in part on one or more of a maximum or minimum output of the renewable energy resource, a maximum or minimum output of the energy storage device, a capacity of an interconnect between the electric power plant and an energy grid, a forecast of an energy production by the electric power plant, and a state of charge of the energy storage device. The maximum or minimum output of the renewable energy resource may be related to environmental factors effecting the resource. For example, a solar resource can have a maximum output at normal solar incidence and a minimum output on a cloudy day. The maximum or minimum output of the energy storage device may be related to the type of energy storage device used. For example, a battery can have a maximum output based on the chemical reactions that release the electricity from the battery. In another example, a different battery may have a minimum constant discharge. The capacity of the interconnect may be as described elsewhere herein. For example, the capacity can be related to the throughput capacity of a substation. The forecast may be as described elsewhere herein. For example, a clear forecast can result in an increased maximum output for the AGC. The state of charge of the energy storage device can influence the upper or lower limit by, in conjunction with the maximum or minimum output of the energy storage device, determining the length of time that the energy storage device can discharge for. In an example, an upper limit of the AGC range can be calculated from a maximum forecast output of the resource, a maximum discharge rate of the energy storage device, and a maximum output of a substation between the power plant and the grid. In this example, the current charge of the energy storage device can dictate the time period the AGC is good for.

The forecast may provide a plurality of ranges of possible production values for the electric power plant. For example, depending on the forecast, the production values can be higher or lower based on the actual conditions. Each range of the plurality of ranges may be associated with a confidence interval. The confidence interval may relate to a statistical likelihood of a given range being accurate. For example, a range of 5 to 25 kilowatts can be provided with a confidence of 75%, and a range of 10 to 15 kilowatts can be provided with a confidence of 50%. Providing the range of possible production values can enable the central utility to issue AGC's for a value based on the utility's risk tolerance for the value. For example, when the utility determines that the power drawn from the plant is critical to the functioning of the grid, the utility can issue an AGC for a range with a high confidence interval. The forecast may be for a time longer than the time period. For example, the forecast can be for a 24 hour period, but the time period of the AGC can be for a 4 hour period. The longer forecast time may provide increased confidence in the values given for the particular time period.

In some embodiments, signaling the range of automatic generation controls to the central utility may cause the central utility to change how it controls the power grid. For instance, the central utility may distribute energy to various loads over time using an internal optimization function that is configured to determine the most efficient or cost effective method to distribute energy to the various loads. The central utility may implement the optimization function by executing various algorithms such as deterministic and/or machine learning algorithms. The optimization function may use various inputs to determine how to distribute the energy, such as the energy that is currently stored in the power grid and ranges of automatic generation controls that are provided to the central utility by various energy sources. The central utility may input the range of automatic generation controls for the time period into the internal optimization function to determine a new energy distribution and subsequently distribute energy to the loads according to the new energy distribution.

The method 100 may optionally comprise supplying, from the electric power plant to an energy grid, an amount of electricity within the range of automatic generation controls (130). If the power plant receives a request for an amount of power above an upper limit of the range, the power plant may supply an amount of power equal to the upper limit. For example, for a range with an upper limit of 50 kilowatts, a power plant can provide 50 kilowatts to a request for 60 kilowatts. If the power plant receives a request for an amount of power below a lower limit of the range, the power plant may supply an amount of power equal to the lower limit. For example, for a range with a lower limit of 1 kilowatt, the power plant can provide 1 kilowatt to a request for 0 kilowatts.

FIGS. 7-8 are examples of pseudocode for a charging logic loop and a discharge logic loop, respectively, for generating an AGC range, according to some embodiments. Though described in these examples with respect to a photovoltaic renewable resource, the methods implemented by the pseudocode can be used for other renewable resources as described elsewhere herein. The pseudocode may run at predetermined timesteps. The pseudocode may be used to generate an AGC range for a time period. For example, the pseudocode can be run at the end of each previous time period to form an AGC range for the next time period. The available energy may be a sum of a forecasted energy production from the renewable resource during the time period and the maximum energy the energy storage device can discharge during the time period. The maximum energy the energy storage device can discharge during the time period can be the lesser of a) a maximum discharge rate achievable by the energy storage device multiplied by the duration of the time period and b) an amount of energy stored in the device. For example, an energy storage device with a maximum rated output of 1 kilowatt per hour and a charge of 10 kilowatts can have a maximum power of 1 kilowatt per hour for a 5-hour period. In another example, an energy storage device with a maximum rated output of 10 kilowatts and a charge of 10 kilowatt hours can have a maximum power of 2 kilowatts for a 5-hour period. The required energy may be an amount of energy that can be delivered to a grid from the electric power plant through a grid interconnect (e.g., a substation) if power from the plant were delivered at the level of an AGC request for the entire time period.

In some embodiments, the pseudocode (or any other operations or code for determining an AGC range for a time period) can be run during consecutive time periods. For example, the pseudocode may be used to generate an AGC range for a first time period. During the first time period, the pseudocode can be run again to generate an AGC range for a second time period subsequent to the first time period. The AGC ranges may be transmitted to the central utility as soon as they are determined or calculated. Consequently, the central utility may be able to better prepare for differences in the AGC ranges, for instance if there is a sudden shift in the amount of power a renewable energy source may generate (such as if there was a sudden change in the weather forecast for a day). Further, the central utility may be able to prepare for each time period instead of waiting for a new AGC range at the end of the time periods, therefore eliminating any time gap in which the central utility does not have any data about how much energy to expect.

In the pseudocode, a BESS may be a battery energy storage system. The battery energy storage system may be an energy storage device as described elsewhere herein. Though used in this example to refer to batteries, the methods outlined by this pseudocode may be used for other energy storage devices. The BESS may have a maximum power the BESS can be discharged during the time period (e.g., BESS_discharge_capacity). The maximum power may be the lesser of the maximum rated discharge power of the BESS (e.g., the BESS output capacity) and the remaining energy (e.g., SOC, SOE, etc.) of the BESS divided by the length of the time period as described elsewhere herein. The headroom may be a measure of the amount of power that the energy storage device (e.g., BESS) is capable of discharging during the time period. The headroom may be the lesser of a) an interconnection limit (e.g. IC limit, the maximum amount of power that can be delivered to a grid through an interconnection point (e.g., a substation)) minus a capacity of a renewable resource (e.g., the amount of power forecast to be produced by the renewable resource) and b) the BESS_discharge_capacity.

The BESS upper bound can be a maximum limit on the amount of power than can be discharged from the BESS, while the BESS lower bound can be a minimum limit on the amount of power that can be discharged from the BESS. In both cases, a positive value can represent power discharging from the BESS while a negative value can represent power charging the BESS. The chargeable_pv can be a minimum of a) a production capacity (e.g., a power production capacity) of the renewable energy resource and b) a maximum charging power limit of the BESS (e.g., a charging capacity unrelated to the BESS upper bound and BESS lower bound). The AGC_signal can be a power output requested by an AGC signal. For example, a grid operator can send an AGC request to the power plant, and the request can comprise a value for AGC_signal. The value for pv_current can be a power production of the renewable energy resource at the time that the pseudocode is ran. The value of pv_current can change with varying conditions of the renewable energy resource. pv_forecast can be the predicted energy production during the next time interval (e.g., the next time period starting from the current time or a predetermined time period).

For the first case of the charging logic of FIG. 7, if the available energy is greater than the required energy, the first set of comparisons can be performed. In this case, the BESS upper bound can be the minimum value from the headroom and the BESS_discharge_capacity. For example, if the BESS were to output more power than the headroom, the grid interconnect can be overloaded and power wasted. In another example where the headroom is greater than the BESS_discharge_capacity, the BESS cannot exceed its maximum discharge capacity even if there is headroom to allow such discharge. The BESS_lower_bound can be the negative of the chargeable_pv. For example, the lower bound output of the BESS can be only the amount of energy the BESS is capable of intaking from the renewable resource. In this example, the BESS can be used to decrease the amount of power output by the renewable resource. The BESS ideal can be a measure of the optimal output of the BESS to satisfy the AGC command that is received. For example, if the BESS upper bound is more than the AGC_signal minus the pv_current power, the power plant can output power from the BESS to supplement the renewable resource and achieve the predetermined AGC level. In this example, if the BESS lower bound is lower than the AGC_signal minus the pv_current power, the power plant can output power from the BESS to exactly achieve the AGC request. In this example, if the BESS lower bound is higher than the AGC_signal minus the pv_current power, the BESS can output energy at the level of the lower bound.

In cases where the available forecasted energy from the power plant is equal to the required energy, the second portion of the pseudocode of FIG. 7 is used. In those cases, the output of the BESS can be set to the negative of chargeable_pv for all bounds, as the output of the renewable resource meets the AGC. If the available forecasted energy from the power plant is less than the required energy, a greedy charging scenario may be implemented. For example, the algorithm can direct all or substantially all of the output of the power plant to charging the BESS. In this example, the output can be directed until the time period of the AGC, at which point the power from the power plant and the BESS can be used to attempt to fill the AGC request.

For the example of the first code portion of FIG. 8, if the available headroom is greater than the required headroom, the first portion of the pseudocode may be executed. In this case, the BESS upper bound can be the minimum of the headroom and the BESS_discharge_capacity. For example, the upper bound of the output of the BESS can be determined by the lesser of the amount of headroom there is between the output of the renewable resource and the rated output capacity of the BESS. The BESS lower bound can be the inverse of chargeable_pv as described elsewhere herein. The value of BESS ideal can be as described elsewhere herein with respect to the charging logic of FIG. 7. In cases where the available forecast headroom is less than or equal to the required headroom, the second portion of the pseudocode of FIG. 8 can be implemented. In this case, since the forecast meets the required headroom, the BESS can be bypassed or used to a full capacity as managed by the headroom value.

Figure 9:
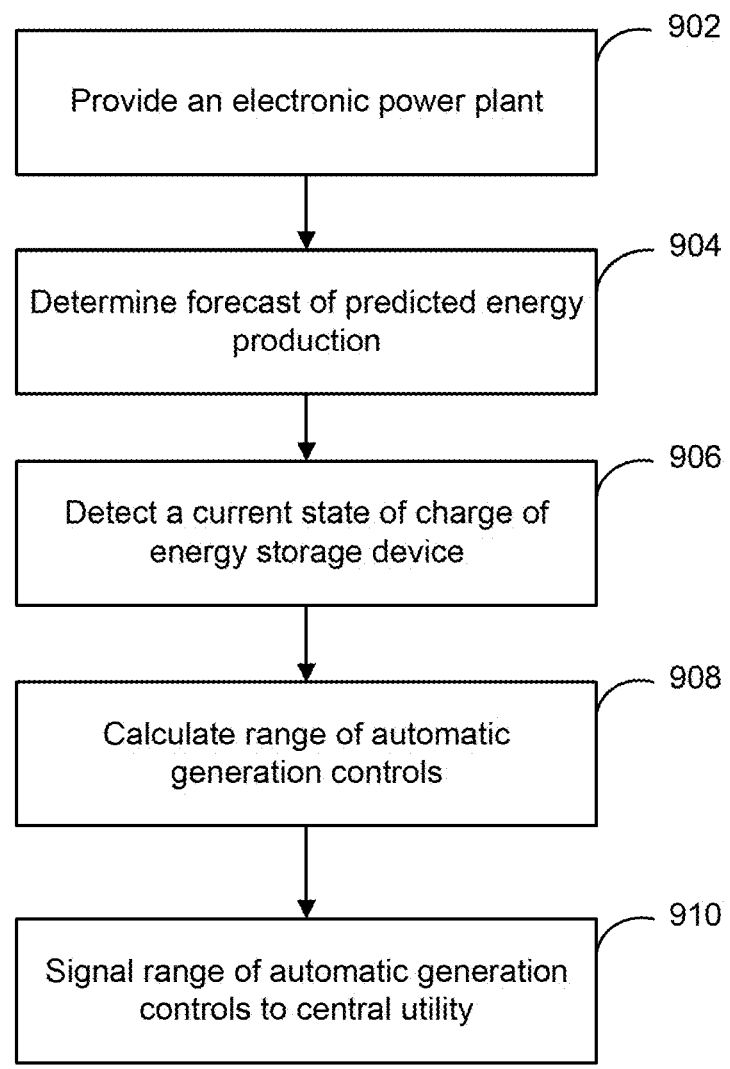
FIG. 9 illustrates a method for automatic generation control of renewable energy resources, according to some embodiments.

FIG. 9 illustrates a method 900 for automatic generation control of renewable energy resources, in accordance with one or more embodiments. Method 900 can be performed by a data processing system (e.g., a controller, a computer of computing system 601, shown and described with reference to FIG. 6, etc.). Method 900 may include more or fewer operations and the operations may be performed in any order. Performance of method 900 may enable the data processing system to provide advance information of the range of AGC commands it could satisfy in a next time interval to a central utility, enabling the central utility to both a) issue an AGC command with confidence the plant will satisfy it, and b) plan for the (potentially limited) range of AGC the plant is capable of at each time interval.

At operation 902, the data processing system may provide an electric power plant and an energy storage device. The energy storage device may be configured to receive energy from various renewable energy sources. At operation 904, the data processing system may determine a forecast of predicted energy production of the electric power plant. The data processing system may determine the predicted energy production for a future time period. The data processing system may determine the energy forecast based on a weather forecast (or any other type of forecast) that the data processing system receives from a weather forecast provider and based on the renewable energy sources (e.g., windmills or solar panels) that generate energy from the weather. In some embodiments, the data processing system generates the forecast of predicted energy production based on historical energy production forecasts at the power plant. In one example, the data processing system may identify the actual energy production of the power plant at a corresponding time period to the time of the forecast of predicted energy production (e.g., if the forecast of predicted energy production is from 1 pm to 2 pm on Tuesday, the data processing system may identify the actual energy production from 1 pm to 2 pm on the preceding Monday and determine the forecast of predicted energy production from 1 pm to 2 pm on Tuesday is the same). In another example, the data processing system may determine the forecast of predicted energy production from the time period is an average of actual energy production at the same time of previous days or time periods. The data processing system may determine the forecast of energy production based on any rule or historical energy production values.

At operation 906, the data processing system may detect a current state of charge of an energy storage device of the electric power plant. The data processing system may do so by analyzing the current state of the energy storage device and/or by maintaining a record of the amount of energy that has been stored in the energy storage device, the amount of energy that has been distributed from the energy storage device, and/or the amount of the energy that has dissipated from the energy storage device. The data processing system may calculate the current state of charge, for example, by subtracting the dissipated and distributed energy from the stored energy. In doing so, the data processing system may keep a real-time record of the state of charge of the energy storage device.

At operation 908, the data processing system may calculate a range of automatic generation controls. The data processing system may calculate the range of automatic generation controls as described below with reference to FIG. 10. In calculating the range, the data processing system may execute pseudocode (e.g., the pseudocode described above) to calculate a range of automatic generation controls the electric power plant is capable of satisfying for the future time period based on the forecast of predicted energy production and the detected current state of charge of the energy storage device. The data processing system may set the upper and lower limit of the range by writing the values for the upper and lower limits into a message. At operation 910, the data processing system may signal the range of automatic generation controls to a central utility (e.g., transmit the generated message to the central utility).

Figure 10:
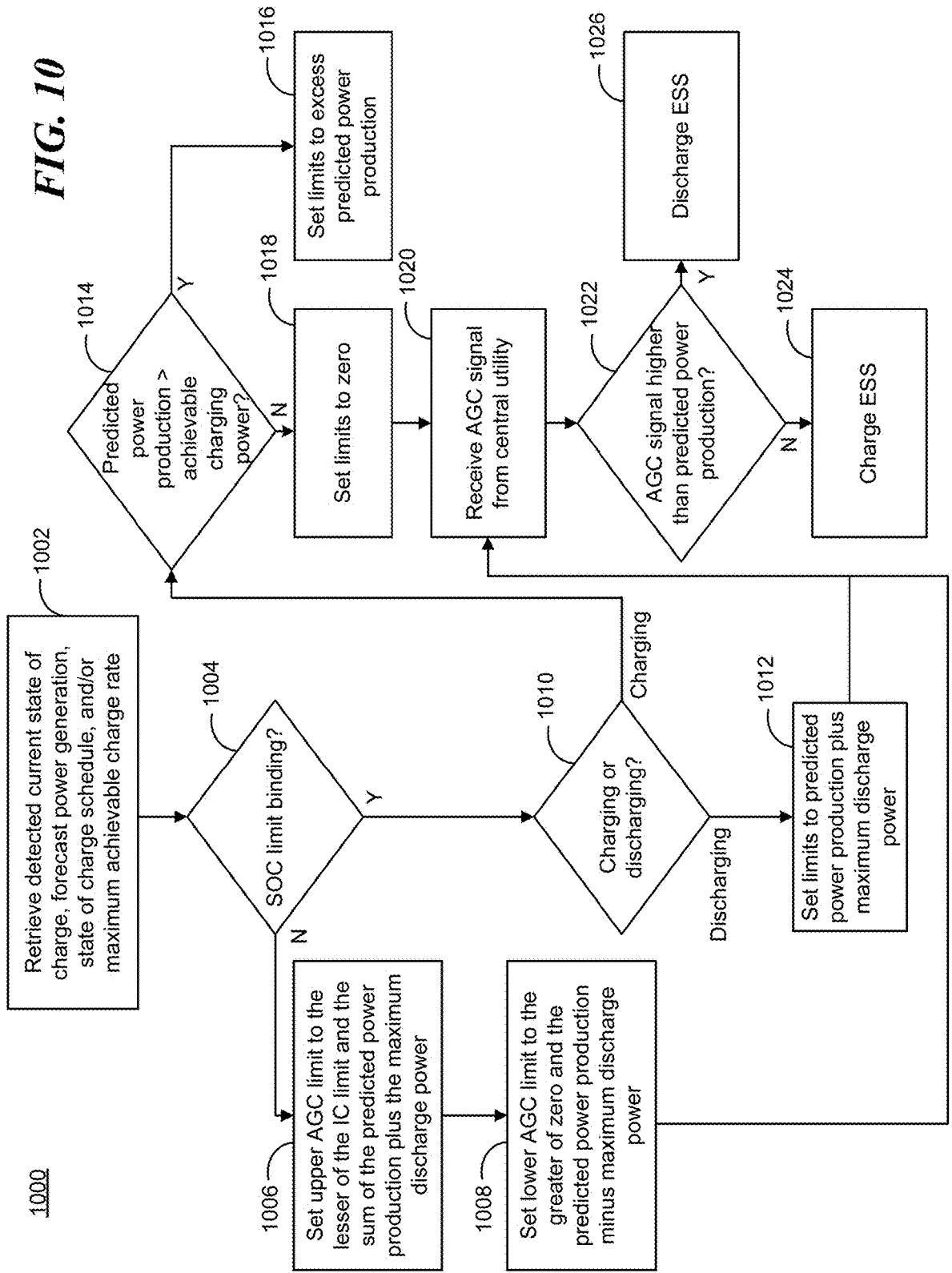
FIG. 10 illustrates a method for calculating an AGC range, according to some embodiments.

FIG. 10 illustrates a method 1000 for calculating a range of AGC control signals that can be sent to central utility for power distribution control of a power grid. Method 1000 can be performed by a data processing system (e.g., a controller, a computer of computing system 601, shown and described with reference to FIG. 6, etc.). Method 1000 may include more or fewer operations and the operations may be performed in any order. Performance of method 1000 may enable the data processing system to determine a range of AGC control signals based on forecast energy production for a time period and the current charge of an energy storage device for which the data processing system provides charge and discharge instructions.

At operation 1002, the data processing system retrieves information about the current state of charge of the energy storage device and the predicted energy generation for a time period as set forth in method 900 (e.g., a future time period from the time the data processing system is performing method 1000). For example, the data processing system may retrieve the current state of charge of the energy storage device, the forecast predicted energy production (e.g., predicted energy production) by the electric power plant during the time period, the maximum rate at which the energy storage device may be charged, and/or the storage capacity of the energy storage device. The data processing system may retrieve these values from memory after detecting the current state of charge of the energy storage device and the predicted energy production of the power plant for the time period. In some embodiments, the data processing system may also retrieve a state of charge schedule that indicates target state of charge percentages at different times throughout the time period.

In some embodiments, the data processing system may determine a predicted power production for the time period. The data processing system may determine the predicted power production based on the retrieved predicted energy production and a duration of the time period. For example, the data processing system may determine the predicted power production for the time period by dividing the predicted energy production for the time period by the duration (e.g., one hour, five hours, 10 hours, one day, two days, etc.) of the time period. The data processing system may then use the predicted production for the time period to determine or set the AGC range, as described below.

At operation 1004, the data processing system determines if the state of charge limit of the energy storage device is binding. The state of charge limit may be a target amount of energy for the energy storage device to store for a given time point during the time period. The state of charge limit may be listed in a state of charge schedule that the data processing system retrieves from memory for different time points throughout a time period, such as a day. The data processing system may determine whether the state of charge limit for a predefined time during or at the end of the time period (e.g., the next time on the state of charge schedule as compared to the current time) of the energy storage device is binding by determining either a) to reach the state of charge limit at the predefined time, the energy storage device needs to be charged at the lesser of (i) the energy storage device's maximum achievable charging rate, and (ii) the predicted power production; or (b) to reach the state of charge limit at the predefined time, the energy storage device must be discharged at its maximum achievable rate between the current time and the time when the state of charge limit applies. In one example, the state of charge limit may become binding when the state of charge limit for the next time point on the state of charge schedule indicates for the data processing system to charge the energy storage device to the maximum power the energy storage device can handle or the maximum power the power plant can deliver (whichever is less) from the current time until the time the state of charge limit applies.

To make the determination as to whether the state of charge limit is binding, the data processing system may identify the current charge (e.g., current state of charge) of the energy storage device as the detected charge and compare the current charge to the state of charge limit for the predefined time to determine an amount the energy storage device needs to be charged to reach the state of charge limit. The data processing system may determine (e.g., based on stored tables in memory) how much energy the power plant is predicted to generate between the current time and the predefined time (e.g., the predicted energy production), how much the power plant can charge the energy storage device between the two times, and how much energy the power plant can distribute (e.g., how much energy a point of interconnection on the power grid can receive during the time period) between the two times. The data processing system may then make the determinations in a) and b) above based on the identified values. For instance, the data processing system may multiply the maximum discharge or distribution rate by the time between the current time and the predefined time to determine a total amount of energy the energy storage device can discharge energy over the time period and subtract the determined total amount from the current charge to determine if the energy storage device is capable reaching the target state of charge at the predefined time.

Responsive to determining neither of the conditions (a) or (b) are satisfied in operation 1004 (and therefore determining the state of charge limit is not binding), at operation 1006, the data processing system sets the upper AGC limit of the range to the lesser of (i) the power limit at the point of interconnection of the power grid, and (ii) the sum of the predicted power production and the maximum achievable energy storage device discharge power. At operation 1008, the data processing system sets the lower AGC limit to the greater of (i) zero, and (ii) the predicted power production minus the maximum achievable energy storage device charging power.

However, responsive to determining one of the conditions (a) and (b) are satisfied in operation 1004 (and therefore determining the state of charge limit is binding), at operation 1010, the data processing system determines whether to charge or discharge the energy storage device during the time period. The data processing system may do so by comparing the current charge of the energy storage device to the next state of charge limit of the state of charge schedule. If the data processing system determines the current charge exceeds the next state of charge limit (e.g., the state of charge limit of the next time of the state of charge schedule), the data processing system may determine to discharge the energy storage device during the time period. If the data processing system determines the current charge is less than the next state of charge limit or threshold, the data processing system may determine to charge the energy storage device during the time period. In some embodiments, the data processing system may do so by identifying an identifier in the state of charge schedule identifying a charge or discharge status.

Responsive to determining to discharge the energy storage device during the time period, at operation 1012, the data processing system sets the upper and lower AGC limits to the predicted power production plus the maximum achievable energy storage device discharge power (e.g., the amount of energy currently stored in the energy storage device plus the amount of energy that is predicted to be generated). Notably, in this case, if the central utility sends an AGC signal below the lower AGC limit but above the maximum achievable energy storage device discharge power to the data processing system, the data processing system may still control the charge and distribution rates of the energy storage device to achieve the next state of charge target by curtailing PV energy production or may deliver power at the level of the lower AGC limit, depending on the implementation. However, if the central utility sends an AGC signal that is not only below the lower AGC limit but also below the maximum achievable energy storage device discharge power, the data processing system may not be able to achieve the state of charge target.

Responsive to determining to charge the energy storage device, at operation 1014, the data processing system determines if the predicted power production will be less than or equal to the maximum achievable charge rate of the energy storage device. The data processing system may do so by comparing the predicted power production for the time interval and determining if the predicted power production exceeds the maximum achievable charge rate of the energy storage device. If the data processing system determines the predicted power production will be less than or equal to the maximum achievable charge rate of the energy storage device, at operation 1016, the data processing system sets both limits to zero, thus indicating no energy will be delivered to the power grid during the time period. However, if the data processing system determines the predicted power production will be greater than the maximum achievable charging power of the energy storage device, at operation 1018, the data processing system sets the upper and lower AGC limits to the excess predicted power production over the maximum achievable energy storage device charging power.

After transmitting the AGC limits to the central utility operating the power grid to help enable the central utility optimize energy distribution on the power line (as described above), at operation 1020, the data processing system receives an AGC signal from the central utility for the time period. The AGC signal may include a request for power from the power plant. At operation 1022, the data processing system determines if the AGC signal is higher than the predicted power production. The data processing system may do so by comparing the value of the AGC signal to the predicted power production. If the data processing system determines the AGC signal is lower than the predicted power production, at operation 1024, the data processing system charges the energy storage device at a power equal to the lesser of (a) the excess of the predicted power production above the AGC signal, and (b) the maximum achievable charging power of the energy storage device. However, if the data processing system determines the AGC signal is higher than the predicted power production, at operation 1026, the data processing system discharges the energy storage device at a power equal to the lesser of (a) the amount by which the AGC signal exceeds the predicted power production, and (b) the maximum achievable discharge power of the energy storage device. The data processing system may repeat methods 900 and/or 1000 for time periods between each time indicated in the state of charge schedule that the data processing system has stored in memory.

In some embodiments, as described above the decisions the data processing system makes in performing methods 900 and/or 1000 relate to a state of charge schedule (e.g., a series of points in time where there are target states of charge of the energy storage device) that is stored in memory of the data processing system. The state of charge may be the amount of energy that could be delivered by the energy storage device if the energy storage device were to be fully discharged divided by the maximum energy that could be discharged from the energy storage device from a fully-charged state. For example, if the energy storage device is half-charged, it is at a 50% state of charge. In some cases, the state of charge percentages may be based on artificial maximum and/or minimum operating limits that may be specified in the state of charge schedule (e.g., lithium-ion batteries may be limited to a maximum state of charge of 90% and a minimum state of charge of 10%). With a state of charge schedule, there may be a requirement that the energy storage device should be at no less than an 80% state of charge (SOC) at 4 pm, and another that calls for no less than a 25% state of charge at 10 pm and yet another for 25% state of charge at 6 am. This means the energy storage device must be charged during the day, 55% of its capacity can be discharged between 4 pm and 10 pm, and none of the capacity of the energy storage device can be discharged between 10 pm and 6 am. Notably, in this example, the energy storage device can be discharged between 6 am and whenever the sun is high enough to start charging it again.

Accordingly, the "next state of charge limit" is the minimum or maximum state of charge to be met according to the stored state of charge schedule, and it has an associated point in time (the required time for the state of charge limit). Continuing with the above example, during the day, such a state of charge and point in time may be 80% at 4 pm. The current time may be 2 pm, and the energy storage device may only be 20% charged. The data processing system may calculate how much energy needs to be stored in the energy storage device to charge the energy storage device to 80% by 4 pm. The data processing system may also calculate how much energy would be produced by the forecast predicted energy production in the time between 2 pm and 4 pm. If it would take all of that energy that is forecast to be generated during the two hour period, the data processing system may determine the state of charge limit has become binding, and thus that the energy that is predicted to be generated during the two hour period cannot be used for anything else (e.g., transmitted to the power grid).

In another example, the data processing system may determine the predicted energy production in the next two hours would be more than enough to charge the energy storage device according to the stored state of charge schedule, but it would take two hours to charge the energy storage device at the maximum charging rate of the energy storage device. In this example, the state of charge limit may become binding because the energy storage device may only be charged at a set rate and therefore cannot be used to alter how the leftover energy is distributed to other loads.

Overall, the state of charge limit may becomes binding when the state of charge limit forces an extreme: charge the energy storage device at either the maximum power the energy storage device can handle, or the maximum power the predicted energy generation can deliver (whichever is less), from the beginning of the time period (e.g., the current time) until the time when the state of charge limit applies.

In performing methods 900 and 1000, the data processing system may provide expected power output to a central utility, particularly, provide information in the form of an upper AGC limit and a lower AGC limit that will apply to an upcoming interval of time (e.g., a time period comprising an interval of time such as a five-minute interval, a one-hour interval, a two-hour interval, etc.). The lower AGC limit may be the lowest level of power a power plant operator would like to deliver during the upcoming period. Generally speaking, the power plant may be able to deliver zero power, which may be less than the lower AGC limit. However, the lower AGC limit may enable the power plant operator to communicate the minimum power the power plant can deliver without curtailing energy production. Thus, the lower AGC limit may be a "soft" limit in that the central utility operating the power grid could send an AGC signal below the lower AGC limit. In contrast, the upper AGC limit may be a "hard" limit. For instance, if the central utility sends an AGC signal above the upper AGC limit, the power plant operator will likely not be able to satisfy the AGC signal at all.

In performing the methods described herein, it can be assumed that the predicted energy production output of the renewable energy sources will be constant throughout the respective interval. That being said, for longer intervals, it may be unlikely that actual instantaneous PV power output will be constant throughout the interval. There are several ways to overcome this deficiency. For example, the data processing system may convert forecast instantaneous PV power outputs (or forecast ranges of instantaneous PV power outputs) into a fixed-for-the-period forecast value by calculating an average of the forecast instantaneous values (or an average of the range of values) across the period; calculating a value such that the instantaneous value is forecast to be above the computed value at least 50%, 90%, 99%, etc., of the time during the interval; calculating a median of the forecast instantaneous values, etc.

Similarly, in performing the methods described herein, it can be assumed that the maximum achievable power output limit for the energy storage system (energy storage device) is constant throughout the interval. This limit may be established by the physical limits of the energy storage device itself, but in some cases it may be established by the remaining energy in the energy storage device, insofar as the energy storage device would be fully discharged (or discharged to its minimum operating state of charge) at the end of the interval if it were to deliver the limiting power level for the full duration of the interval.

Furthermore, it can be assumed that the maximum achievable charging power limit for the energy storage device is constant throughout the interval. The data processing system may establish this limit based on the physical limits of the energy storage device by measuring or calculating the remaining uncharged capacity of the energy storage device, to the extent the energy storage device would be fully charged at the end of the interval if it were to be charged at the limiting power level for the full duration of the interval.

In some cases, the situation where the state of charge limit becomes binding may be undesirable because it "collapses" the AGC range that can be offered to the central utility (because the upper AGC limit and lower AGC limit become identical). The data processing system could, therefore, adopt an approach that narrows the AGC range by a lesser amount before the state of charge limit becomes binding, and thus hopefully avoid having the state of charge limit become binding at all. For example, the data processing system could determine that, to reach the required state of charge limit at the required time (e.g., at the next defined time on the state of charge schedule), the energy storage device must be charged at the lesser of its maximum achievable charging rate or 60% of the predicted energy production in each interval between the present time and the required time. The data processing system could then set aside the lesser of the maximum achievable charging rate of the energy storage device or 60% of the predicted energy production in the next interval, as power to be used to charge the energy storage device. In this case, the upper AGC limit would be the greater of (a) 60% of the predicted energy production and (b) the predicted energy production, minus the maximum achievable charging rate of the energy storage device, in both cases subject to also not exceeding the IC limit. The lower AGC limit would be the greater of (a) zero and (b) the predicted power production minus the maximum achievable energy storage device charging power. The data processing system could use an analogous modification to address situations where the energy storage device would need to discharge in order to achieve the state of charge limit.

These types of alternative approach would somewhat narrow the range of AGC signals the data processing system could satisfy, especially early in each day, but would make it less likely that the state of charge limit would become binding.

Computer Systems

Figure 6:
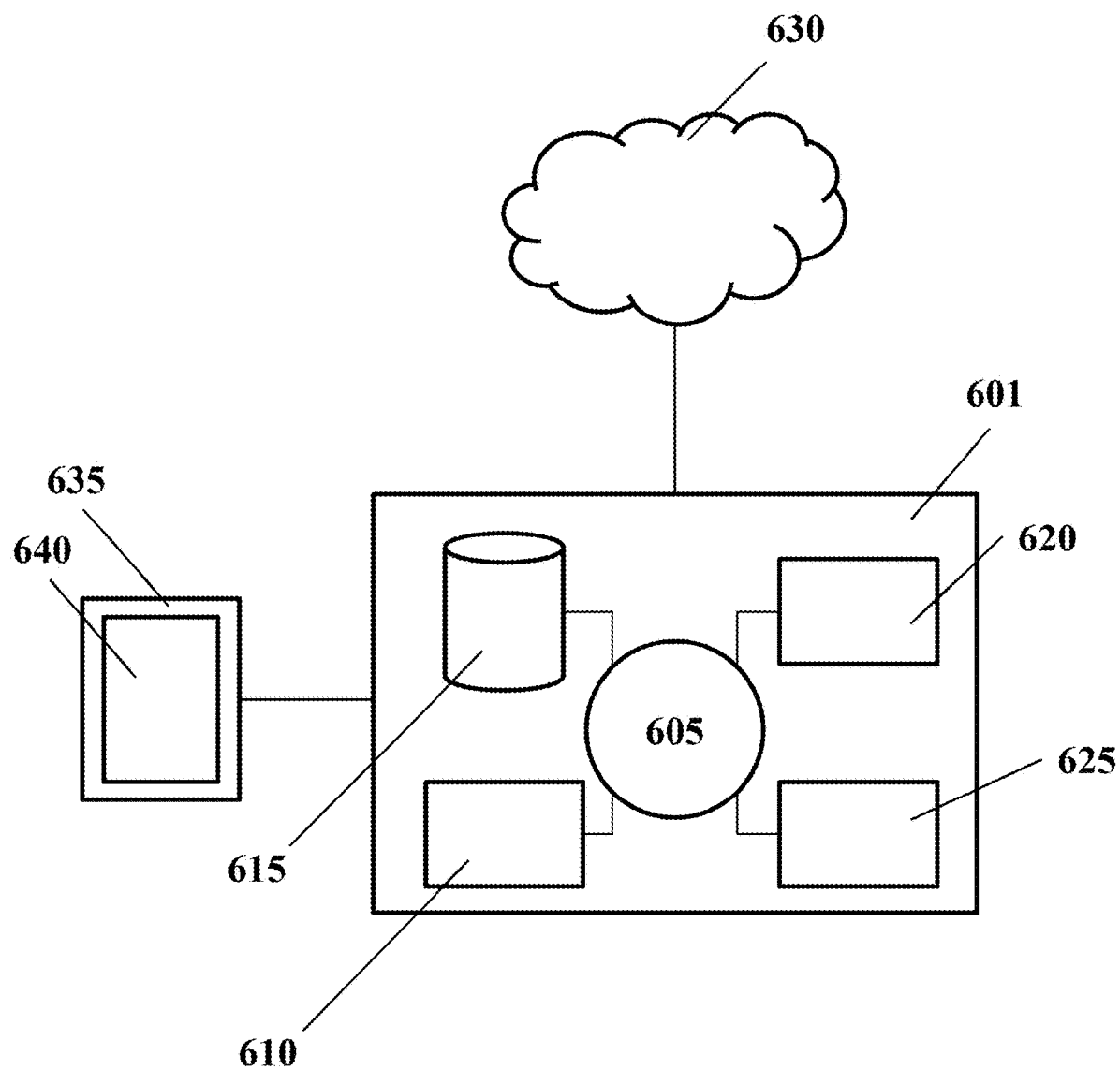
FIG. 6 shows a computer system that is programmed or otherwise configured to implement methods provided herein, according to some embodiments.

The present disclosure provides computer systems that are programmed to implement methods of the disclosure. FIG. 6 shows a computer system 601 that is programmed or otherwise configured to regulate electric power plants. The computer system 601 can regulate various aspects of the present disclosure, such as, for example, the pseudocode of FIGS. 7-8. The computer system 601 can be an electronic device of a user or a computer system that is remotely located with respect to the electronic device. The electronic device can be a mobile electronic device.

The computer system 601 includes a central processing unit (CPU, also "processor" and "computer processor" herein) 605, which can be a single core or multi core processor, or a plurality of processors for parallel processing. The computer system 601 also includes memory or memory location 610 (e.g., random-access memory, read-only memory, flash memory), electronic storage unit 615 (e.g., hard disk), communication interface 620 (e.g., network adapter) for communicating with one or more other systems, and peripheral devices 625, such as cache, other memory, data storage and/or electronic display adapters. The memory 610, storage unit 615, interface 620 and peripheral devices 625 are in communication with the CPU 605 through a communication bus (solid lines), such as a motherboard. The storage unit 615 can be a data storage unit (or data repository) for storing data. The computer system 601 can be operatively coupled to a computer network ("network") 630 with the aid of the communication interface 620. The network 630 can be the Internet, an internet and/or extranet, or an intranet and/or extranet that is in communication with the Internet. The network 630 in some cases is a telecommunication and/or data network. The network 630 can include one or more computer servers, which can enable distributed computing, such as cloud computing. The network 630, in some cases with the aid of the computer system 601, can implement a peer-to-peer network, which may enable devices coupled to the computer system 601 to behave as a client or a server.

The CPU 605 can execute a sequence of machine-readable instructions, which can be embodied in a program or software. The instructions may be stored in a memory location, such as the memory 610. The instructions can be directed to the CPU 605, which can subsequently program or otherwise configure the CPU 605 to implement methods of the present disclosure. Examples of operations performed by the CPU 605 can include fetch, decode, execute, and writeback.

The CPU 605 can be part of a circuit, such as an integrated circuit. One or more other components of the system 601 can be included in the circuit. In some cases, the circuit is an application specific integrated circuit (ASIC).

The storage unit 615 can store files, such as drivers, libraries and saved programs. The storage unit 615 can store user data, e.g., user preferences and user programs. The computer system 601 in some cases can include one or more additional data storage units that are external to the computer system 601, such as located on a remote server that is in communication with the computer system 601 through an intranet or the Internet.

The computer system 601 can communicate with one or more remote computer systems through the network 630. For instance, the computer system 601 can communicate with a remote computer system of a user. Examples of remote computer systems include personal computers (e.g., portable PC), slate or tablet PC's (e.g., Apple® iPad, Samsung® Galaxy Tab), telephones, Smart phones (e.g., Apple® iPhone, Android-enabled device, Blackberry®), or personal digital assistants. The user can access the computer system 601 via the network 630.

Methods as described herein can be implemented by way of machine (e.g., computer processor) executable code stored on an electronic storage location of the computer system 601, such as, for example, on the memory 610 or electronic storage unit 615. The machine executable or machine readable code can be provided in the form of software. During use, the code can be executed by the processor 605. In some cases, the code can be retrieved from the storage unit 615 and stored on the memory 610 for ready access by the processor 605. In some situations, the electronic storage unit 615 can be precluded, and machine-executable instructions are stored on memory 610.

The code can be pre-compiled and configured for use with a machine having a processer adapted to execute the code, or can be compiled during runtime. The code can be supplied in a programming language that can be selected to enable the code to execute in a pre-compiled or as-compiled fashion.

Aspects of the systems and methods provided herein, such as the computer system 601, can be embodied in programming. Various aspects of the technology may be thought of as "products" or "articles of manufacture" typically in the form of machine (or processor) executable code and/or associated data that is carried on or embodied in a type of machine readable medium. Machine-executable code can be stored on an electronic storage unit, such as memory (e.g., read-only memory, random-access memory, flash memory) or a hard disk. "Storage" type media can include any or all of the tangible memory of the computers, processors or the like, or associated modules thereof, such as various semiconductor memories, tape drives, disk drives and the like, which may provide non-transitory storage at any time for the software programming. All or portions of the software may at times be communicated through the Internet or various other telecommunication networks. Such communications, for example, may enable loading of the software from one computer or processor into another, for example, from a management server or host computer into the computer platform of an application server. Thus, another type of media that may bear the software elements includes optical, electrical, and electromagnetic waves, such as used across physical interfaces between local devices, through wired and optical landline networks and over various air-links. The physical elements that carry such waves, such as wired or wireless links, optical links, or the like, also may be considered as media bearing the software. As used herein, unless restricted to non-transitory, tangible "storage" media, terms such as computer or machine "readable medium" refer to any medium that participates in providing instructions to a processor for execution.

Hence, a machine readable medium, such as computer-executable code, may take many forms, including but not limited to, a tangible storage medium, a carrier wave medium or physical transmission medium. Non-volatile storage media include, for example, optical or magnetic disks, such as any of the storage devices in any computer(s) or the like, such as may be used to implement the databases, etc. shown in the drawings. Volatile storage media include dynamic memory, such as main memory of such a computer platform. Tangible transmission media include coaxial cables; copper wire and fiber optics, including the wires that comprise a bus within a computer system. Carrier-wave transmission media may take the form of electric or electromagnetic signals, or acoustic or light waves such as those generated during radio frequency (RF) and infrared (IR) data communications. Common forms of computer-readable media therefore include for example: a floppy disk, a flexible disk, hard disk, magnetic tape, any other magnetic medium, a CD-ROM, DVD or DVD-ROM, any other optical medium, punch cards paper tape, any other physical storage medium with patterns of holes, a RAM, a ROM, a PROM and EPROM, a FLASH-EPROM, any other memory chip or cartridge, a carrier wave transporting data or instructions, cables or links transporting such a carrier wave, or any other medium from which a computer may read programming code and/or data. Many of these forms of computer readable media may be involved in carrying one or more sequences of one or more instructions to a processor for execution.

The computer system 601 can include or be in communication with an electronic display 635 that comprises a user interface (UI) 640 for providing, for example, a representation of a control of a power plant. Examples of UI's include, without limitation, a graphical user interface (GUI) and web-based user interface.

Methods and systems of the present disclosure can be implemented by way of one or more algorithms. An algorithm can be implemented by way of software upon execution by the central processing unit 605. The algorithm can, for example, be an implementation of the pseudocode found in FIGS. 7-8.

The following examples are illustrative of certain systems and methods described herein and are not intended to be limiting.

Example 1—Time Resolved AGC Data

FIGS. 2-5 are examples of time resolved output graphs, according to some embodiments.

Figure 2:
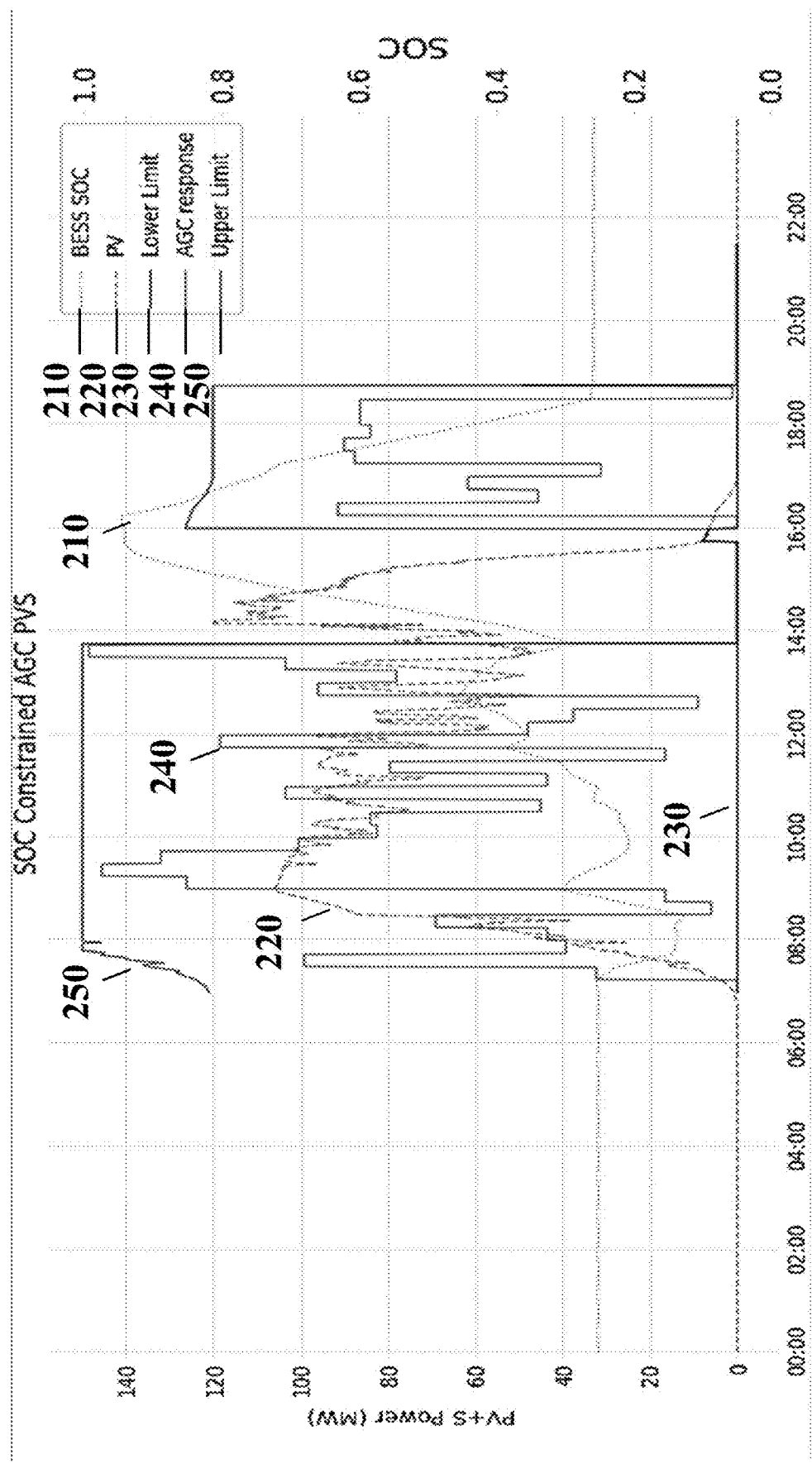
FIGS. 2-5 are examples of time resolved output graphs, according to some embodiments.
Figure 3:
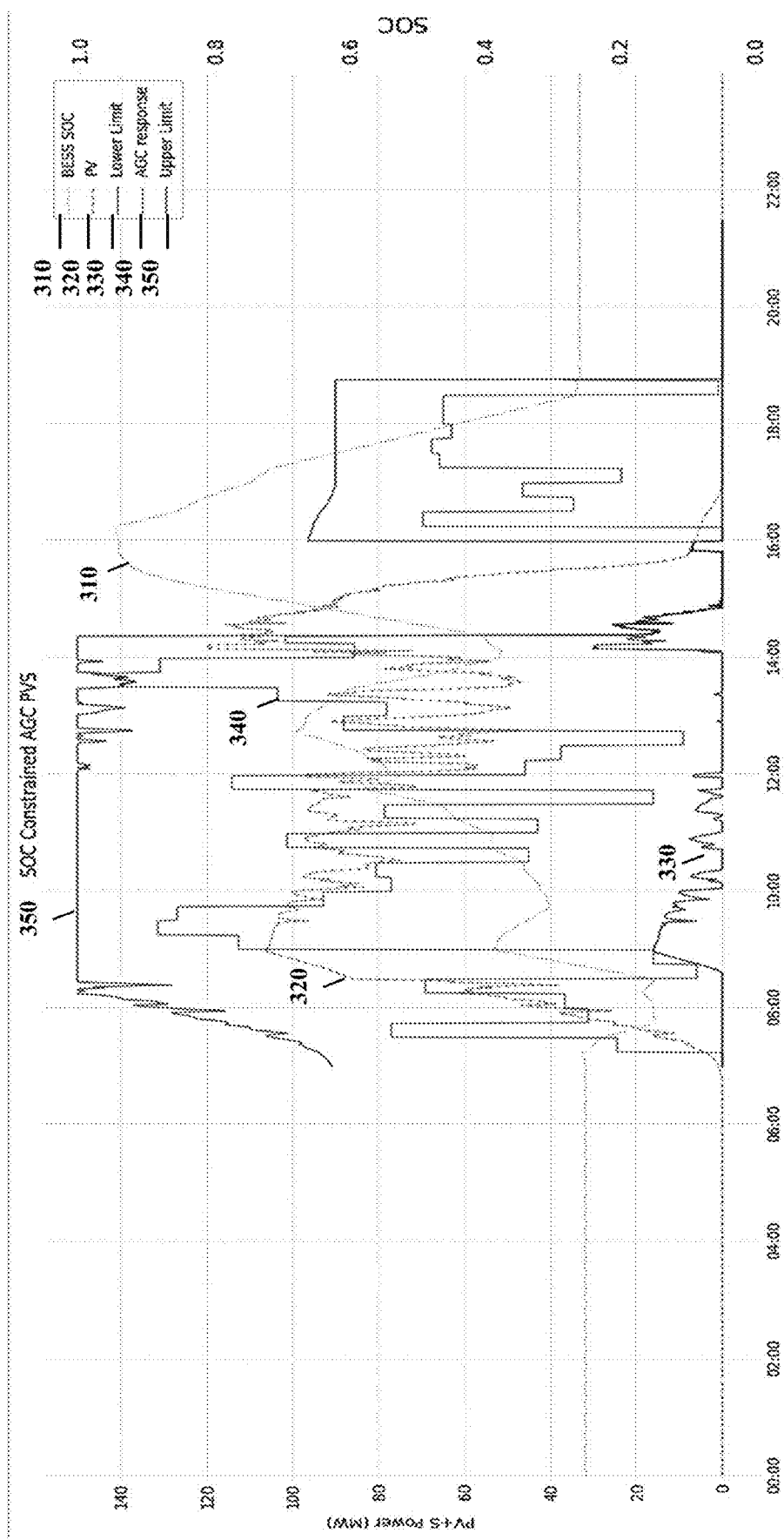
Figure 4:
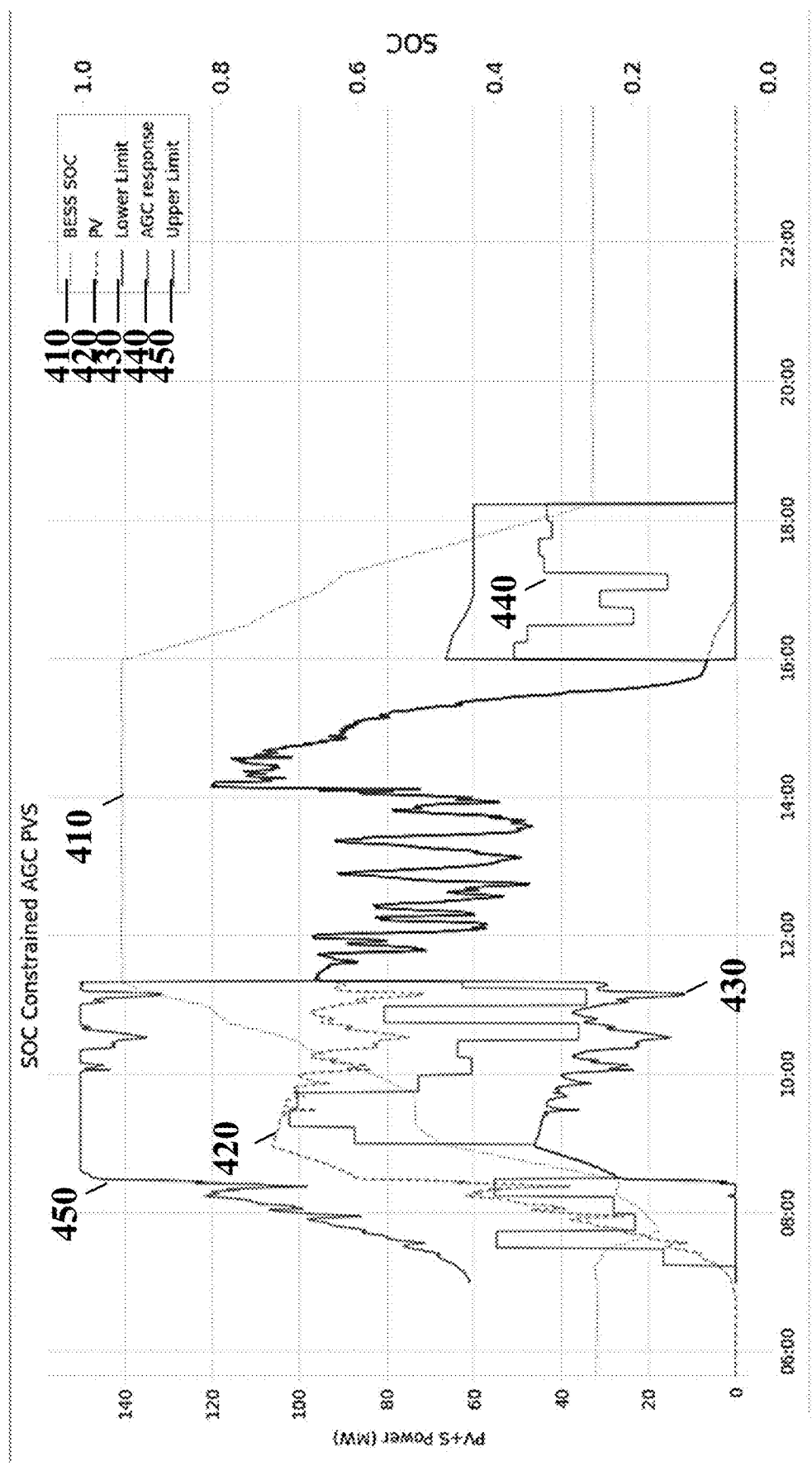

These examples may be for an electric power plant comprising a renewable resource and an energy storage device connected to a power grid through a grid interconnect. In the examples, the time intervals are very short, so that the upper AGC limit, lower AGC limit, PV Power and BESS SOC appear to vary continuously, while changing very little within each time interval. The AGC Signals may take place over longer periods and vary in a step-wise fashion in different cases or embodiments. The process for addressing longer time intervals is described above. Further, in each example, the state of charge (SOC) target for the energy storage device was set to 25% at the start and adjusted to 95% at 16:00 and 25% at 21:30. FIG. 2 is a graph for an example system with a 120 megawatt renewable energy resource (e.g., solar resource), a 240 megawatt hour (2×120 megawatt hour) energy storage device (e.g., BESS), and a grid interconnect capacity of 150 megawatts; FIG. 3 for an example system with a 120 megawatt renewable energy resource, a 180 megawatt hour (2×90 megawatt hour) energy storage device, and a grid interconnect capacity of 150 megawatts; FIG. 4 for an example system with a 120 megawatt renewable energy resource, a 120 megawatt hour (2×60 megawatt hour) energy storage device, and a grid interconnect capacity of 150 megawatts; and FIG. 5 for an example system with a 120 megawatt renewable energy resource, a 240 megawatt hour (4×60 megawatt hour) energy storage device, and a grid interconnect capacity of 150 megawatts.

Referring now to FIG. 2, in this example, a line 250 represents the upper AGC limit, a line 230 represents the lower AGC limit (which may be zero most of the time), a line 220 represents actual PV power (which is assumed, for purposes of illustration, to be equal to the short-term forecast of PV power), a line 240 represents the AGC signal sent by the central utility, and a line 210 represents the ESS state of charge. In this example, the upper AGC limit is equal to the IC limit for much of the morning (excepting those times when the sum of the PV power plus the maximum achievable ESS discharge was below the IC limit) and into the early afternoon. However, shortly before 14:00, the SOC limit becomes binding and no power is sent to the POI (upper and lower AGC limits become zero) until the ESS has been charged at just before 4 μm. Thereafter, the upper AGC limit rises again, but by 16:30 it is limited to the maximum achievable discharge power of the ESS because the PV output has dropped to zero. Shortly before 19:00 the ESS reaches its target SOC for the night and the upper AGC limit falls to zero.

Referring now to FIG. 3, as illustrated in FIG. 3, a line 350 represents the upper AGC limit, a line 330 represents the lower AGC limit (which may be zero most of the time), a line 320 represents actual PV power (which is assumed, for purposes of illustration, to be equal to the short-term forecast of PV power), a line 340 represents the AGC signal sent by the central utility, and a line 310 represents the ESS state of charge. In this example, the upper AGC limit rises up to the IC limit as before, but during the early afternoon the PV output falls (presumably due to weather). Here, the ESS power limit is lower than in the first case illustrated, and as a result the combined PV power and maximum achievable ESS discharge power are less than the IC limit at times between 12:00 and 13:30, resulting in the upper ACG limit also falling below the IC limit then. Shortly after 14:00 the PV power rises sharply, and—again because of the lower power limits of the ESS—the lower AGC limit rises above zero because the maximum achievable ESS charging power is lower than the PV power. At around 14:30 the PV power falls again, and the SOC limit becomes binding. In the evening hours, with the battery having been fully charged by 16:00, the situation is very similar to what we saw in the first case illustrated, except that the ESS discharge power limit is lower.

Referring now to FIG. 4, as illustrated in FIG. 4, a line 450 represents the upper AGC limit, a line 430 represents the lower AGC limit (which may be zero most of the time), a line 420 represents actual PV power (which is assumed, for purposes of illustration, to be equal to the short-term forecast of PV power), a line 440 represents the AGC signal sent by the central utility, and a line 410 represents the ESS state of charge. In this example, the AGC signal from the central utility is well below the upper AGC limit, and the ESS capacity is smaller than in the previous cases illustrated. The ESS becomes fully charged by around 11:00, resulting in both the upper AGC limit and the lower AGC limit becoming equal to the PV Power until 16:00. At 16:00, the SOC limit still applies, but after that time it does not and the upper AGC limit can rise as in the previous cases. The evening hours play out similarly to the previous cases illustrated, except that the ESS discharge power limit is still lower.

Figure 5:
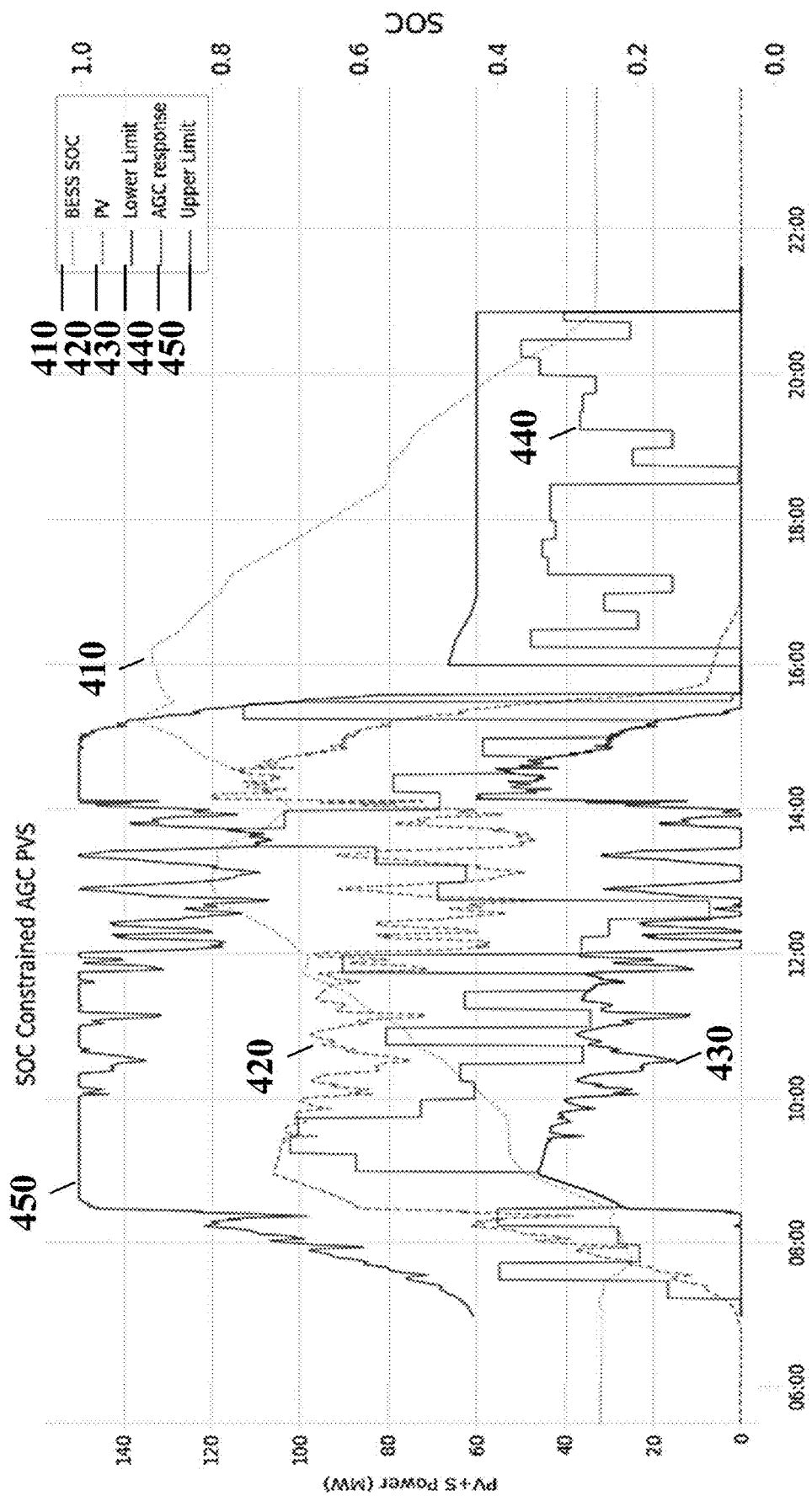

Referring now to FIG. 5, as illustrated in FIG. 5, a line 550 represents the upper AGC limit, a line 530 represents the lower AGC limit (which may be zero most of the time), a line 520 represents actual PV power (which is assumed, for purposes of illustration, to be equal to the short-term forecast of PV power), a line 540 represents the AGC signal sent by the central utility, and a line 510 represents the ESS state of charge. In this example, the ESS capacity is relatively small, so that the upper AGC limit and lower AGC limit tend to track the PV Power through much of the day, displaced from the PV Power by the maximum achievable discharge and charge powers (respectively) of the ESS.

While preferred embodiments of the present invention have been shown and described herein, it will be obvious to those skilled in the art that such embodiments are provided by way of example only. It is not intended that the invention be limited by the specific examples provided within the specification. While the invention has been described with reference to the aforementioned specification, the descriptions and illustrations of the embodiments herein are not meant to be construed in a limiting sense. Numerous variations, changes, and substitutions will now occur to those skilled in the art without departing from the invention. Furthermore, it shall be understood that all aspects of the invention are not limited to the specific depictions, configurations or relative proportions set forth herein which depend upon a variety of conditions and variables. It should be understood that various alternatives to the embodiments of the invention described herein may be employed in practicing the invention. It is therefore contemplated that the invention shall also cover any such alternatives, modifications, variations, or equivalents. It is intended that the following claims define the scope of the invention and that methods and structures within the scope of these claims and their equivalents be covered thereby.

What is claimed is:

1. A method, comprising:
   determining, at a first time, a forecast of predicted energy production by an electric power plant over a time period subsequent to the first time based on a forecast for the time period, the electric power plant comprising a renewable energy resource and an energy storage device;
   detecting a current state of charge of the energy storage device;
   calculating a range of automatic generation controls the electric power plant is capable of satisfying for the time period based on the forecast of predicted energy production and the detected current state of charge of the energy storage device;
   signaling, from the electric power plant to a central utility controlling a power grid, the range of automatic generation controls the electric power plant is capable of satisfying for the time period;
   receiving, during the time period, a request for an amount of power below a lower bound of the range; and
   responsive to the request, sending, from the electric power plant, power equal to the lower bound to the power grid.

2. The method of claim 1, wherein receipt of the range of automatic generation controls causes the central utility to:
   input the range of automatic generation controls into an optimization function for distributing energy from the power grid over the time period; and
   distribute energy to one or more loads from the power grid according to an output of the optimization function.

3. The method of claim 1, wherein the time period is a first time period, the forecast of predicted energy production is a first forecast of predicted energy production, the current state of charge is a first current state of charge, and the range of automatic generation controls is a first range of automatic generation controls, further comprising:
   during the first time period, determining a second forecast of predicted energy production by the electric power plant over a second time period subsequent to the first time period, based on a forecast for the second time period;
   detecting a second current state of charge of the energy storage device;
   calculating a second range of automatic generation controls the electric power plant is capable of satisfying for the second time period subsequent to the first time period; and
   signaling, from the electric power plant to the central utility, the second range of automatic generation controls the electric power plant is capable of satisfying for the second time period.

4. The method of claim 1, wherein calculating the range of automatic generation controls comprises:
- determining a predicted power production based on the predicted energy production and a duration of the time period;
- determining a state of charge limit of the energy storage device has become binding;
- responsive to the determining the state of charge limit of the energy storage device has become binding, determining to discharge the energy storage device; and
- responsive to the determining to discharge the energy storage device, setting upper and lower limits of the range of automatic generation controls to the predicted power production plus a maximum achievable discharge power of the energy storage device.

5. A method, comprising:
- determining, at a first time, a forecast of predicted energy production by an electric power plant over a time period subsequent to the first time based on a forecast for the time period, the electric power plant comprising a renewable energy resource and an energy storage device;
- detecting a current state of charge of the energy storage device;
- calculating a range of automatic generation controls the electric power plant is capable of satisfying for the time period based on the forecast of predicted energy production and the detected current state of charge of the energy storage device; and
- signaling, from the electric power plant to a central utility controlling a power grid, the range of automatic generation controls the electric power plant is capable of satisfying for the time period, wherein calculating the range of automatic generation controls comprises:
  - determining a predicted power production based on the predicted energy production and a duration of the time period;
  - determining a state of charge limit of the energy storage device has become binding;
  - responsive to the determining the state of charge limit of the energy storage device has become binding, determining to charge the energy storage device; and
  - responsive to the determining to charge the energy storage device, setting upper and lower limits of the range of automatic generation controls to an excess predicted power production over a maximum achievable charging power of the energy storage device.

6. The method of claim 5, wherein setting the upper and lower limits of the range of automatic generation controls to an excess predicted power production is performed further responsive to determining the predicted power production exceeds the maximum achievable charge power of the energy storage device.

7. A method, comprising:
- determining, at a first time, a forecast of predicted energy production by an electric power plant over a time period subsequent to the first time based on a forecast for the time period, the electric power plant comprising a renewable energy resource and an energy storage device;
- detecting a current state of charge of the energy storage device;
- calculating a range of automatic generation controls the electric power plant is capable of satisfying for the time period based on the forecast of predicted energy production and the detected current state of charge of the energy storage device; and
- signaling, from the electric power plant to a central utility controlling a power grid, the range of automatic generation controls the electric power plant is capable of satisfying for the time period, wherein calculating the range of automatic generation controls comprises:
  - determining a predicted power production based on the predicted energy production and a duration of the time period;
  - determining a state of charge limit of the energy storage device has not become binding; and
  - responsive to the determining the state of charge limit of the energy storage device has not become binding, setting an upper limit of the range of automatic generation controls to a lesser of (a) a power limit of a point of interconnection of the power grid, and (b) a sum of the predicted power production and a maximum achievable discharge power of the energy storage device.

8. The method of claim 7, wherein calculating the range of automatic generation controls comprises further responsive to the determining the state of charge limit of the energy storage device has not become binding, setting a lower limit of the range of automatic generation controls to a greater of (a) zero, and (b) the predicted power production minus the maximum achievable discharge power of the energy storage device.

9. The method of claim 1, wherein calculating the range of automatic generation controls comprises calculating a confidence score for the range of automatic generation controls,
- wherein signaling the range of automatic generation controls to the central utility comprises transmitting the confidence score for the range with the range.

10. A system, comprising:
- one or more computer processors operatively coupled to computer memory,
- wherein the one or more computer processors are configured by machine-readable instructions to:
  - determine, at a first time, a forecast of predicted energy production by an electric power plant over a time period subsequent to the first time based on a forecast for the time period, the electric power plant comprising a renewable energy resource and an energy storage device;
  - detecting a current state of charge of the energy storage device;
  - calculate a range of automatic generation controls the electric power plant is capable of satisfying for the time period based on the forecast of predicted energy production and the detected current state of charge of the energy storage device;
  - signal, from the electric power plant to a central utility controlling a power grid, the range of automatic generation controls the electric power plant is capable of satisfying for the time period;
  - receive, during the time period, a request for an amount of power below a lower bound of the range; and
  - responsive to the request, send, from the electric power plant, power equal to the lower bound to the power grid.

11. The system of claim 10, wherein receipt of the range of automatic generation controls causes the central utility to:
- input the range of automatic generation controls into an optimization function for distributing energy from the power grid over the time period; and
- distribute energy to one or more loads from the power grid according to an output of the optimization function.

12. The system of claim 10, wherein the time period is a first time period, the forecast of predicted energy production is a first forecast of predicted energy production, the current state of charge is a first current state of charge, and the range of automatic generation controls is a first range of automatic generation controls, wherein the one or more computer processors are further configured by machine-readable instructions to:
- during the first time period, determine a second forecast of predicted energy production by the electric power plant over a second time period subsequent to the first time period, based on a weather forecast for the second time period;
- detect a second current state of charge of the energy storage device;
- calculate a second range of automatic generation controls the electric power plant is capable of satisfying for the second time period subsequent to the first time period; and
- signal, from the electric power plant to the central utility, the second range of automatic generation controls the electric power plant is capable of satisfying for the second time period.

13. The system of claim 10, wherein the one or more computer processors are configured by machine-readable instructions to calculate the range of automatic generation controls by:
- determining a predicted power production based on the predicted energy production and a duration of the time period;
- determining a state of charge limit of the energy storage device has become binding;
- responsive to the determining the state of charge limit of the energy storage device has become binding, determining to discharge the energy storage device; and
- responsive to the determining to discharge the energy storage device, setting upper and lower limits of the range of automatic generation controls to the predicted power production plus a maximum achievable discharge power of the energy storage device.

14. The system of claim 10, wherein the one or more computer processors are configured by machine-readable instructions to calculate the range of automatic generation controls by:
- determining a predicted power production based on the predicted energy production and a duration of the time period;
- determining a state of charge limit of the energy storage device has become binding;
- responsive to the determining the state of charge limit of the energy storage device has become binding, determining to charge the energy storage device; and
- responsive to the determining to charge the energy storage device, setting upper and lower limits of the range of automatic generation controls to an excess predicted power production over a maximum achievable charging power of the energy storage device.

15. The system of claim 14, wherein the one or more computer processors are configured by machine-readable instructions to set upper and lower limits of the range of automatic generation controls to an excess predicted power production further responsive to determining the predicted power production exceeds the maximum achievable charge power of the energy storage device.

16. The system of claim 10, wherein the one or more computer processors are configured by machine-readable instructions to calculate the range of automatic generation controls by:
- determining a predicted power production based on the predicted energy production and a duration of the time period;
- determining a state of charge limit of the energy storage device has not become binding; and
- responsive to the determining the state of charge limit of the energy storage device has not become binding, setting an upper limit of the range of automatic generation controls to a lesser of (a) a power limit of a point of interconnection of the power grid, and (b) a sum of the predicted power production and a maximum achievable discharge power of the energy storage device.

17. One or more non-transitory computer storage media storing instructions that are operable, when executed by one or more computers, to cause said one or more computers to perform operations comprising:
- determining, at a first time, a forecast of predicted energy production by an electric power plant over a time period subsequent to the first time based on a forecast for the time period, the electric power plant comprising a renewable energy resource and an energy storage device;
- detecting a current state of charge of the energy storage device;
- calculating a range of automatic generation controls the electric power plant is capable of satisfying for the time period based on the forecast of predicted energy production and the detected current state of charge of the energy storage device;
- signaling, from an electric power plant comprising a renewable energy resource and an energy storage device to a central utility controlling a power grid, the range of automatic generation controls the electric power plant is capable of satisfying for the time period;
- receiving, during the time period, a request for an amount of power below a lower bound of the range; and
- responsive to the request, sending, from the electric power plant, power equal to the lower bound to the power grid.

* * * * *